United States Patent [19]

Cantin et al.

[11] Patent Number: 5,694,597
[45] Date of Patent: Dec. 2, 1997

[54] METHOD AND SYSTEM FOR OPTIMIZING ACCESS TO A DATASTORE

[75] Inventors: Guylaine Cantin, Toronto, Canada; George P. Copeland, Austin, Tex.; Ahmed M. Gheith, Round Rock, Tex.; Roger H. Sessions, Austin, Tex.

[73] Assignee: International Business Machines Corporation, Armonk, N.Y.

[21] Appl. No.: 234,435

[22] Filed: Apr. 26, 1994

[51] Int. Cl.⁶ ..................................................... G06F 17/30
[52] U.S. Cl. ................................................. 395/614; 395/683
[58] Field of Search ..................................... 395/600, 500, 395/575, 700, 155, 157–161, 200.02, 200.01, 650, 616, 701, 614, 683

[56] References Cited

U.S. PATENT DOCUMENTS

| | | | |
|---|---|---|---|
| 5,206,951 | 4/1993 | Khoyi et al. | 395/650 |
| 5,265,206 | 11/1993 | Shackelford et al. | 395/200 |
| 5,291,593 | 3/1994 | Abraham et al. | 395/600 |
| 5,295,256 | 3/1994 | Bapat | 395/500 |
| 5,297,279 | 3/1994 | Bannon et al. | 395/600 |
| 5,377,350 | 12/1994 | Skinner | 395/614 |
| 5,398,336 | 3/1995 | Tantry et al. | 395/600 |
| 5,412,776 | 5/1995 | Bloomfield et al. | 395/160 |
| 5,475,817 | 12/1995 | Waldo et al. | 395/683 |

OTHER PUBLICATIONS

Mastering WORDPERFECT 5.1 & 5.2 for Windows, Alan Simpson, 1992, Sybex Inc., pp. 28–29, 457, 10.
Rafiul Ahad and Tu-Ting Cheng, HP OpenODB: An Object-Oriented Database Management System For Commerical Applications, pp. 20–30, 1266 Hewlett-Packard Journal 44(1993) Jun., No. 3, Palo Alto, CA.

Primary Examiner—Thomas G. Black
Assistant Examiner—Hosain T. Alam
Attorney, Agent, or Firm—Jeffrey S. LaBaw; Duke W. Lee; Andrew J. Dillon

[57] ABSTRACT

A method in a data processing system for optimizing access to a Datastore in an object-oriented environment. The data processing system includes an object and an identification object, wherein the identification object is an instance of a class object. The method includes receiving a request to open the Datastore at the identification object. The request is sent from the identification object its class object in response to receiving the request. Then whether the Datastore is open is determined in response to receiving the request at the class object. The Datastore is opened in response to the Datastore being closed and a message is sent to the identification object indicating that the Datastore has been opened. If the Datastore is already open, a message to the identification object indicating that the Datastore has been opened, wherein access to the Datastore is optimized.

6 Claims, 5 Drawing Sheets

METHOD AND SYSTEM FOR OPTIMIZING ACCESS TO A DATASTORE

CROSS-REFERENCE TO RELATED APPLICATIONS

The present application contains subject matter related to co-pending U.S. patent application Ser. No. 08/234,434, entitled "Persistent Object Mapping System And Method With Abstract Schema Mapper," filed on even date herewith and assigned to the assignee hereof and incorporated by reference herein.

The present application is related to U.S. patent application Ser. No. 08/018,893, entitled "Persistent Object Storage System With Customizable Class For I/O Formatting," filed Feb. 17, 1993, assigned to the assignee herein, and incorporated herein by reference.

The present application is related to U.S. patent application Ser. No. 08/018,608, entitled "Persistent Object Storage System With Modifiable Group Skeletal Formats," filed Feb. 17, 1993, assigned to the assignee herein, and incorporated herein by reference.

The present application is related to U.S. patent application Ser. No. 08/077,348, entitled "Persistent Object Storage System With Default Object Encoder/Decoder," filed Jun. 14, 1993, assigned to the assignee herein, and incorporated herein by reference.

BACKGROUND OF THE INVENTION

1. Technical Field

The present invention relates in general to a method and system for accessing a datastore for object data and in particular to a method and system for optimizing opening and closing of a Datastore for object data in an object-oriented environment. Still more particularly, the present invention relates to a method and system for opening and closing of a Datastore in an object oriented environment by reducing the time devoted to opening and closing a Datastore in an object-oriented environment.

2. Description of the Related Art

Object-oriented programming environments treat the presentation of data and its manipulation as a single entity called an "object", which is a package of information and the description of its manipulation. An object is manipulated by sending a "message" to the object. An object that receives a message determines how to manipulate itself. A "class" describes one or more related objects, and an "instance" of an object is an object described by a particular class. Each instance of an object contains data in "instance variables". All instances of an object in a class have the same instance variables although the actual values of the instance variables may differ. The class contains "methods", which are procedures that are invoked by sending messages to an instance of a class. All objects in a class have the same methods.

Inheritance is a feature of an object-oriented environment. Typically, object-oriented environments provide inheritance between classes. For example, a class may be modified to form a new class, wherein the original class is the "superclass" and the new class is called the "subclass", which inherits everything from the super class.

Another feature of an object-oriented environment is object persistence. An object can have a "dynamic state" and a "persistent state". In the dynamic state, an object is typically in memory and is not likely to exist for the entire lifetime of the object; e.g., the object would not survive a system failure. The persistent state of an object is the data that is used to reconstruct the dynamic state of an object. A standard for implementing object persistence has been set by Object Management Group, Inc. This standard is known as the Object Persistence Service Specification (OPSS), which defines a guidelines for providing interfaces and mechanisms used for retaining and managing the persistent state of objects. A client is an object that manipulates a persistent object.

OPSS defines a number of interfaces including: Persistent Identifier (PID), Persistent Object (PO), Persistent Object Manager (POM), Persistent Data Service (PDS), Protocol, and Datastore. The PID contains information that identifies the storage location for the persistent states of an object. The PO is an object whose persistence is typically controlled externally by its candidates. The PO includes a store/restore interface defining the operations that control the PO's persistent data. The PDS moves data between an object and a datastore. The POM routes storage related requests from the object to a PDS. Protocol provides a mechanism to move data in and out of an object. A Datastore is an interface that provides one of several ways to store an data. A Datastore may be, for example, a database, a record file, or some other type of file and may use well known interfaces for databases and record files. The Datastore provides storage for the persistent state of an object.

Additional information about object-oriented computing can be found in Peterson, Object Oriented Computing, IEEE Computer Society Press, IEEE Computer Society Press Order No. 821 (1990) and in De Champeaux, Object-Oriented System Development, Addison-Wesley Publishing Co. (1993). More information and details regarding the implementation of object persistence may be found in Object Persistence Service Specification, OMG TC document number 93.11.3, which is available from Object Management Group, Inc., located at 492 Old Connecticut Path, Framingham, Mass., 01701.

Under OPSS, a performance problem exists with accessing Datastores. Opening a Datastore is a time consuming process and ideally, should be performed as infrequently as possible. Typically, a Datastore is opened, a series of store/restore operations are performed, and then the datastore is closed. Under OPSS, open/close operations are performed during a connect/disconnect operations. Unfortunately, these operations are defined in the Persistent Object interface in which operations cannot be invoked before a target object is instantiated and cannot be invoked once the object is deinstantiated. If an object accessing a Datastore is instantiated and deinstantiated within a loop, the Datastore must be opened and closed each time the loop occurs, degredating performance. Therefore, it would be advantages to have a method and system for optimizing the opening and closing of the Datastore.

SUMMARY OF THE INVENTION

It is therefore one object of the present invention to provide a method and system for accessing a Datastore.

It is another object of the present invention to provide a method and system for optimizing opening and closing of a Datastore in an object-oriented environment.

It is yet another object of the present invention to provide a method and system for opening and closing of a Datastore in an object oriented environment by reducing the time devoted to opening and closing a Datastore in an object-oriented environment.

The foregoing objects are achieved as is now described. The present invention provides a method in a data processing system for optimizing access to a Datastore in an object-oriented environment. The data processing system includes an object and an identification object, wherein the identification object is within a class object. The method includes receiving a request to open the Datastore at the identification object. The request is sent from the identification object to the class object in response to receiving the request. Then whether the Datastore is open is determined in response to receiving the request at the class object. The Datastore is opened in response to the Datastore being closed and a message is sent to the identification object indicating that the Datastore has been opened. If the Datastore is already open, a message to the identification object indicating that the Datastore has been opened, wherein access to the Datastore is optimized.

In closing the Datastore, a request is received to close the Datastore at the identification object. The request from the identification object is sent to the class object in response to receiving the request at the identification object. Whether other objects require the Datastore to remain open is determined. The Datastore is closed in response to a determination that a requirement that the Datastore remain open is absent. A message to the identification object indicating that the Datastore has been closed. The client of the PID is unaware of any of this. To the client, it appears as if a Datastore open or close was done in response to the open/close request.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF PREFERRED EMBODIMENT

Figure 1:
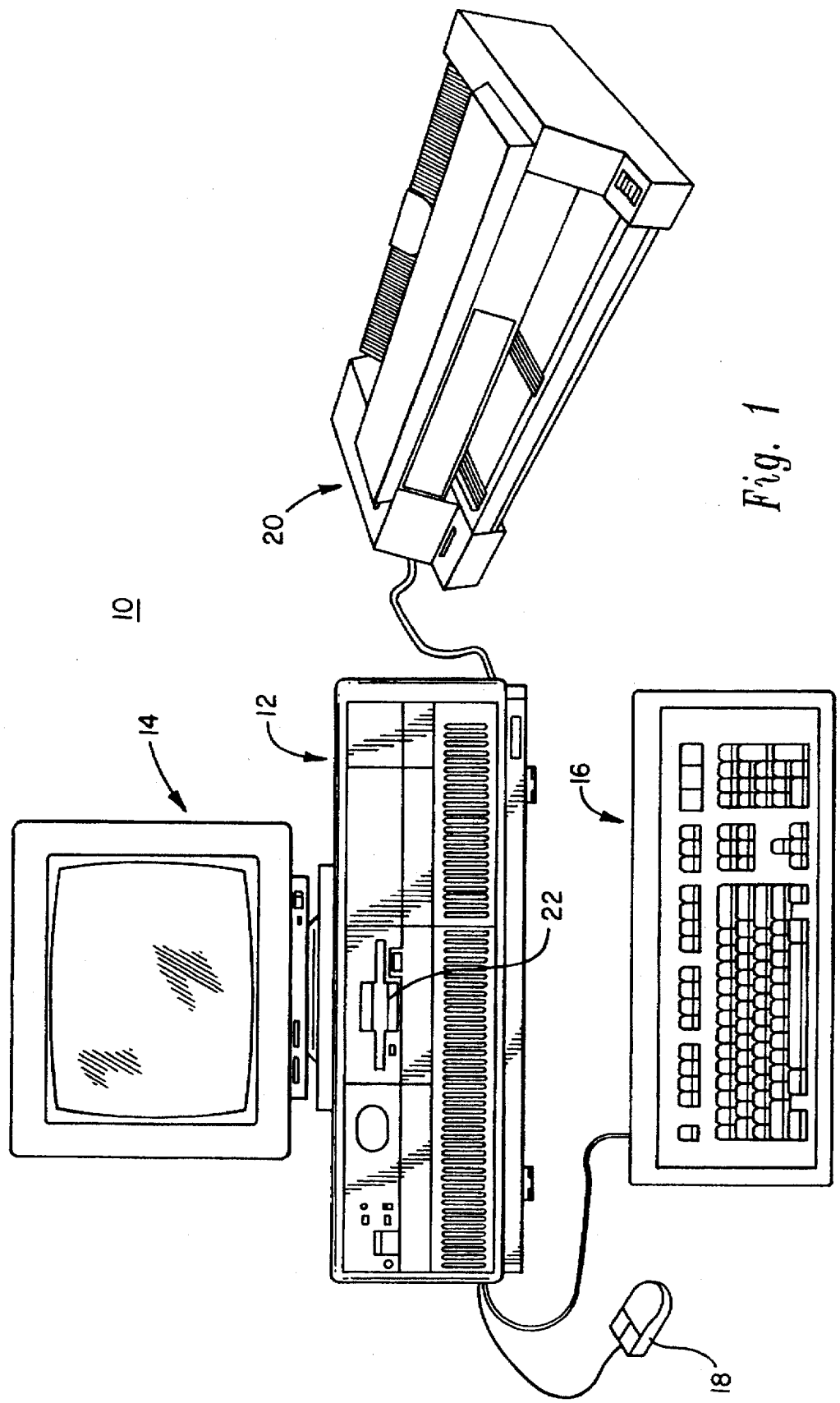
FIG. 1 depicts a data processing system in the form of a personal computer in which the present invention can be employed is depicted.

Referring now to the figures, and in particular to FIG. 1, a data processing system, personal computer system 10, in which the present invention can be employed is depicted. As shown, personal computer system 10 comprises a number of components, which are interconnected together. More particularly, a system unit 12 is coupled to and can drive an optional monitor 14 (such as a conventional video display). A system unit 12 also can be optionally coupled to input devices such as a PC keyboard 16 or a mouse 18. Mouse 18 includes right and left buttons (not shown). The left button is generally employed as the main selector button and alternatively is referred to as the first mouse button or mouse button 1. The right button is typically employed to select auxiliary functions as explained later. The right mouse button is alternatively referred to as the second mouse button or mouse button 2. An optional output device, such as a printer 20, also can be connected to the system unit 12. Finally, system unit 12 may include one or more mass storage devices such as the diskette drive 22.

As will be described below, the system unit 12 responds to input devices, such as PC keyboard 16, the mouse 18, or local area networking interfaces. Additionally, input/output (I/O) devices, such as floppy diskette drive 22, display 14, primer 20, and local area network communication system are connected to system unit 12 in a manner well known. Of course, those skilled in the art are aware that other conventional components also can be connected to the system unit 12 for interaction therewith. In accordance with the present invention, personal computer system 10 includes a system processor that is interconnected to a random access memory (RAM), a read only memory (ROM), and a plurality of I/O devices.

In normal use, personal computer system 10 can be designed to give independent computing power to a small group of users as a server or a single user and is inexpensively priced for purchase by individuals or small businesses. In operation, the system processor functions under an operating system, such as IBM's OS/2 operating system or DOS. OS/2 is a registered trademark of International Business Machines Corporation. This type of operating system includes a Basic Input/Output System (BIOS) interface between the I/O devices and the operating system. BIOS, which can be stored in a ROM on a motherboard or planar, includes diagnostic routines which are contained in a power on self test section referred to as POST.

Figure 2:
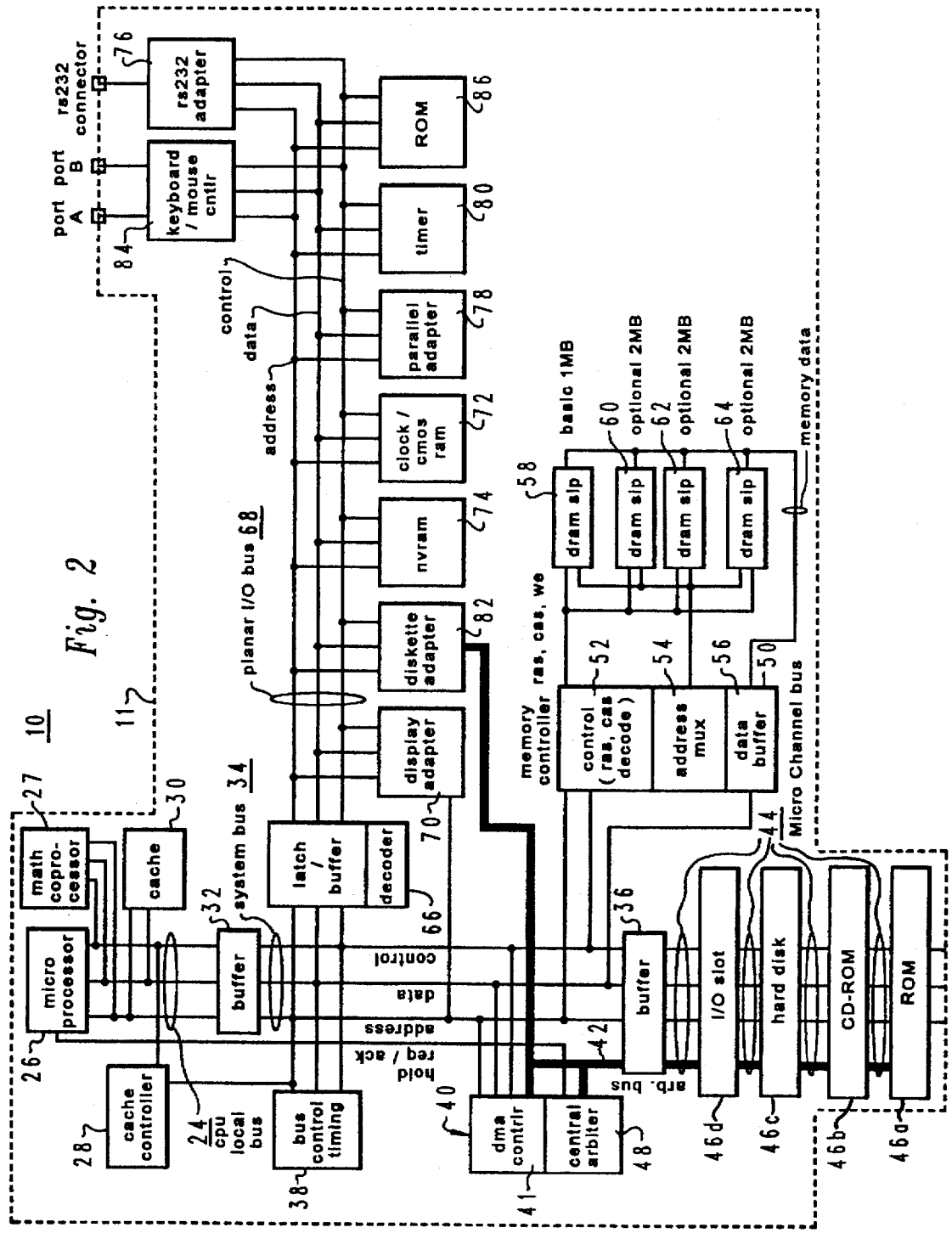
FIG. 2 is a block diagram of a personal computer system illustrating the various components of personal computer system in accordance with the present invention.

Prior to relating the above structure to the present invention, a summary of the operation in general of personal computer system 10 may merit review. Referring to FIG. 2, there is shown a block diagram of personal computer system 10 illustrating the various components of personal computer system 10 in accordance with the present invention. FIG. 2 further illustrates components of planar 11 and the connection of planar 11 to I/O slots 46a–46d and other hardware of personal computer system 10. Connected to planar 11 is the system central processing unit (CPU) 26 comprised of a microprocessor which is connected by a high speed CPU local bus 24 through a bus controlled timing unit 38 to a memory control unit 50 which is further connected to a volatile random access memory (RAM) 58. While any appropriate microprocessor can be used for CPU 26, one suitable microprocessor is the Pentium microprocessor, which is sold by Intel Corporation. "Pentium" is a trademark of Intel Corporation.

While the present invention is described hereinafter with particular reference to the system block diagram of FIG. 2, it is to be understood at the outset of the description which follows, it is contemplated that the apparatus and methods in accordance with the present invention may be used with other hardware configurations of the planar board. For example, the system processor could be an Intel 80286, 80386, or 80486 microprocessor. These particular microprocessors can operate in a real addressing mode or a protected addressing mode. Each mode provides an addressing scheme for accessing different areas of the microprocessor's memory.

Returning now to FIG. 2, CPU local bus 24 (comprising data, address and control components) provides for the connection of CPU 26, an optional math coprocessor 27, a cache controller 28, and a cache memory 30. Also coupled on CPU local bus 24 is a buffer 32. Buffer 32 is itself connected to a slower speed (compared to the CPU local bus) system bus 34, also comprising address, data and control components. System bus 34 extends between buffer 32 and a further buffer 36. System bus 34 is further connected to a bus control and timing unit 38 and a Direct Memory Access (DMA) unit 40. DMA unit 40 is comprised of a central arbitration unit 48 and a DMA controller 41. Buffer 36 provides an interface between the system bus 34 and an optional feature bus such as the Micro Channel bus 44. "Micro Channel" is a registered trademark of International Business Machines Corporation. Connected to bus 44 are a plurality of I/O slots 46a–46d for receiving Micro Channel adapter cards which may be further connected to an I/O device or memory. In the depicted example, I/O slot 46a has a hard disk drive connected to it; I/O slot 46b has a CD-ROM drive connected to it; and I/O slot 46c has a ROM on an adapter card connected to it. An arbitration control bus 42 couples the DMA controller 41 and central arbitration unit 48 to I/O slots 46 and diskette adapter 82. Also connected to system bus 34 is a memory control unit 50 which is comprised of a memory controller 52, an address multiplexer 54, and a data buffer 56. Memory control unit 50 is further connected to a random access memory as represented by RAM module 58. Memory controller 52 includes the logic for mapping addresses to and from CPU 26 to particular areas of RAM 58. While the microcomputer system 10 is shown with a basic 1 megabyte RAM module, it is understood that additional memory can be interconnected as represented in FIG. 2 by the optional memory modules 60 through 64.

A further buffer 66 is coupled between system bus 34 and a planar I/O bus 68. Planar I/O bus 68 includes address, data, and control components respectively. Coupled along planar bus 68 are a variety of I/O adapters and other peripheral components such as display adapter 70 (which is used to drive an optional display 14), a clock 72, nonvolatile RAM 74 (hereinafter referred to as "NVRAM"), a RS232 adapter 76, a parallel adapter 78, a plurality of timers 80, a diskette adapter 82, a PC keyboard/mouse controller 84, and a read only memory (ROM) 86. The ROM 86 includes BIOS which provides the user transparent communications between many I/O devices.

Clock 72 is used for time of day calculations. NVRAM 74 is used to store system configuration data. That is, the NVRAM will contain values which describe the present configuration of the system. For example, NVRAM 74 contains information which describe the capacity of a fixed disk or diskette, the type of display, the amount of memory, etc. Of particular importance, NVRAM 74 will contain data which is used to describe the system console configuration; i.e., whether a PC keyboard is connected to the keyboard/mouse controller 84, a display controller is available or the ASCII terminal is connected to RS232 adapter 76. Furthermore, these data are stored in NVRAM 74 whenever a special configuration program is executed. The purpose of the configuration program is to store values characterizing the configuration of this system to NVRAM 76 which are saved when power is removed from the system.

Connected to keyboard/mouse controller 84 are ports A and B. These ports are used to connect a PC keyboard (as opposed to an ASCII terminal) and mouse to the PC system. Coupled to RS232 adapter unit 76 is an RS232 connector. An optional ASCII terminal can be coupled to the system through this connector.

Specifically, personal computer system 10 may be implemented utilizing any suitable computer such as the IBM PS/2 computer or an IBM RISC SYSTEM/6000 computer, both products of International Business Machines Corporation, located in Armonk, New York. "RISC SYSTEM/6000" is a trademark of International Business Machines Corporation and "PS/2" is a registered trademark of International Business Machines Corporation.

Figure 3:
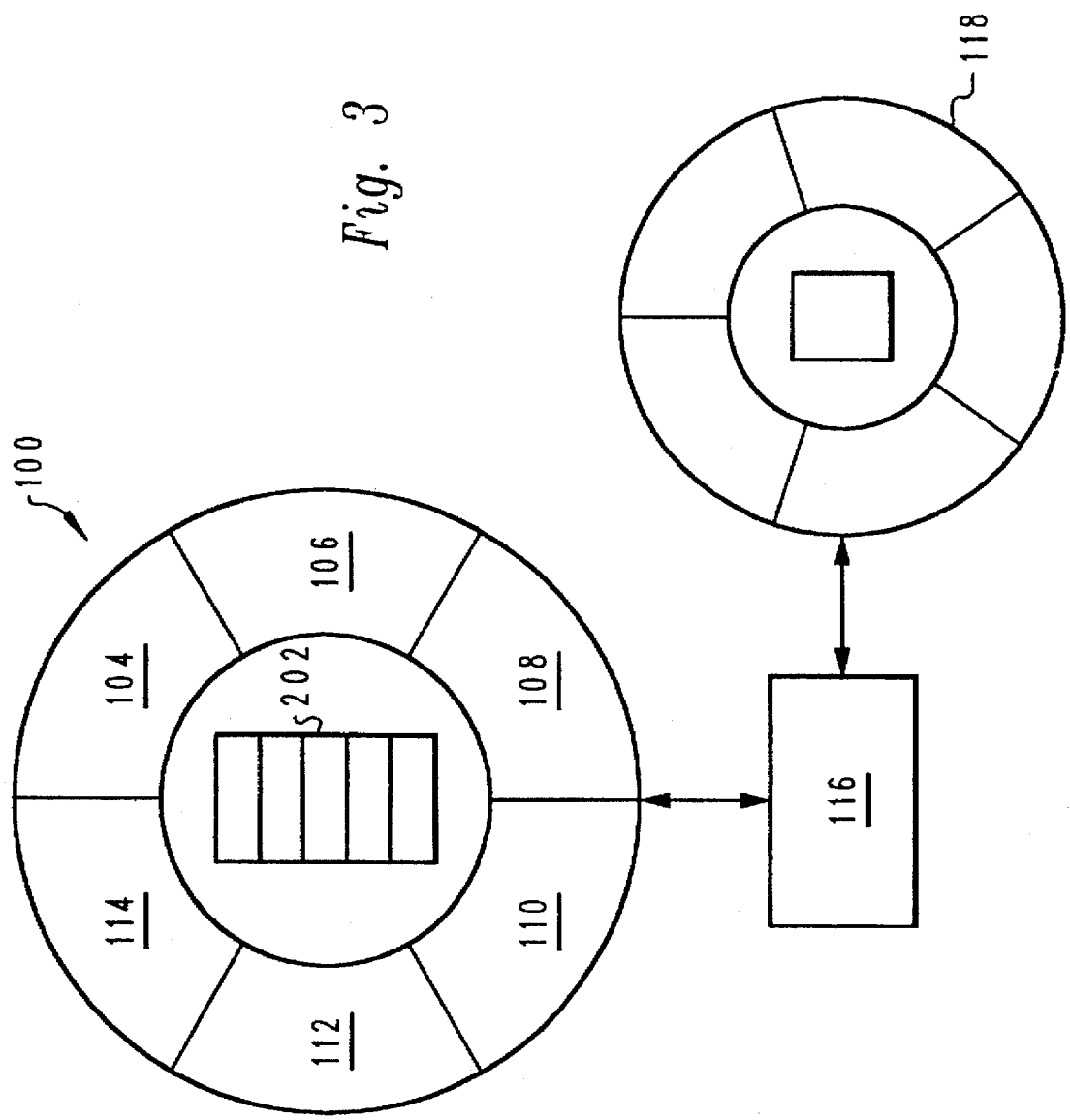
FIG. 3 depicts a diagram of object in an object-oriented environment.

An object encapsulates data and the methods needed to operate on that data. Objects can be represented by a "doughnut diagram" such as illustrated in FIG. 3 in accordance with a preferred embodiment of the present invention. Object data 102 is depicted in the center of object 100 surrounded by applicable methods 104 to 114. Data 102 may be modified only by the methods of that object. Methods 104–114 are invoked by receiving messages from other objects. A typical object-oriented system will have a message router 116 that routes messages between objects. Thus, object 118 causes method 108 to be invoked by sending a message to message router 116, which in turns sends the message to method 208 of object 100. Object 100 may be a persistent object that has data stored externally in a Datastore (not shown).

Figure 4:
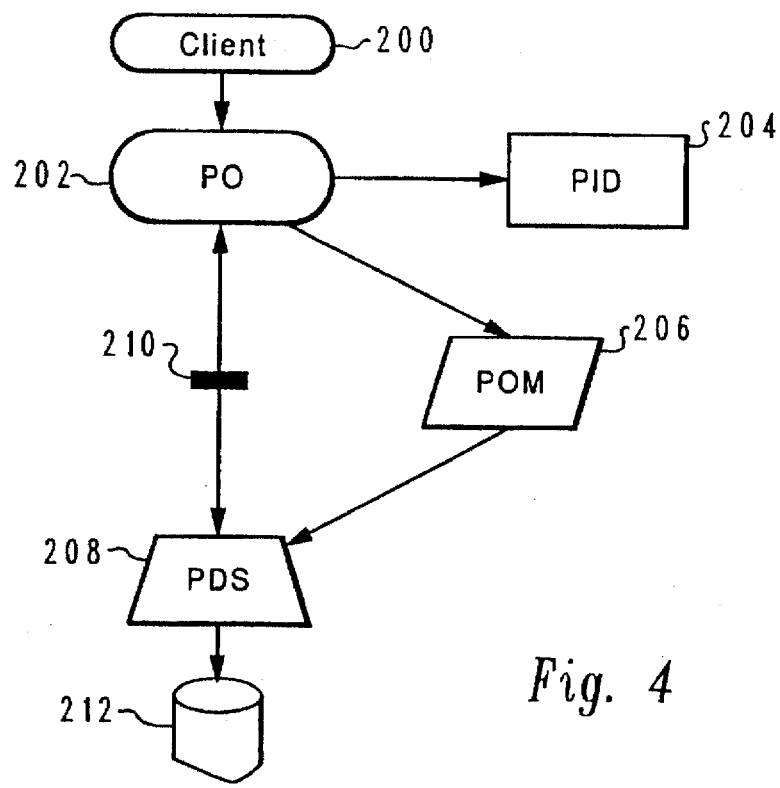
FIG. 4 is a diagram illustrating components employed to support persistent objects in an object-oriented environment.

Referring now to FIG. 4, an illustration of components employed in supporting persistent objects in an object-oriented system. Client 200 manipulates Persistent Object (PO) 202, which has a Persistent Identifier (PID) 204 associated with it. Persistent Object Manager (POM) 206 provides an interface for PO 202's persistence operations. Persistence Data Service (PDS) 208 receives requests from POM 206 and receives data from PO 202 through Protocol 210. PDS 208 provides an interface to Datastore 212, which stores PO 202's data.

Previously, Client 200 sends a request to PO 202 to open Datastore 212. In response, PO 202 sends a request to POM 206 to open Datastore 212. In turn, POM 206 opens Datastore 212, using PDS 208. After Datastore 212 is opened and data from PO 202 would be sent to PDS 208 using Protocol 210. PDS 208 then stores data in Datastore 212. Afterwards, Datastore 212 is closed. Data also could restored to PO 202 while Datastore 212 using this procedure. In this prior art procedure, the open and close operations are defined in the Persistent Object interface. Operations cannot be invoked before the target object is instantiated and cannot be invoked after the object is deinstantiated. Also, if a second persistent object is accessing Datastore 212, each time PO 202 or the second persistent object accesses Datastore 212, the Datastore must be opened and closed.

Figure 5:
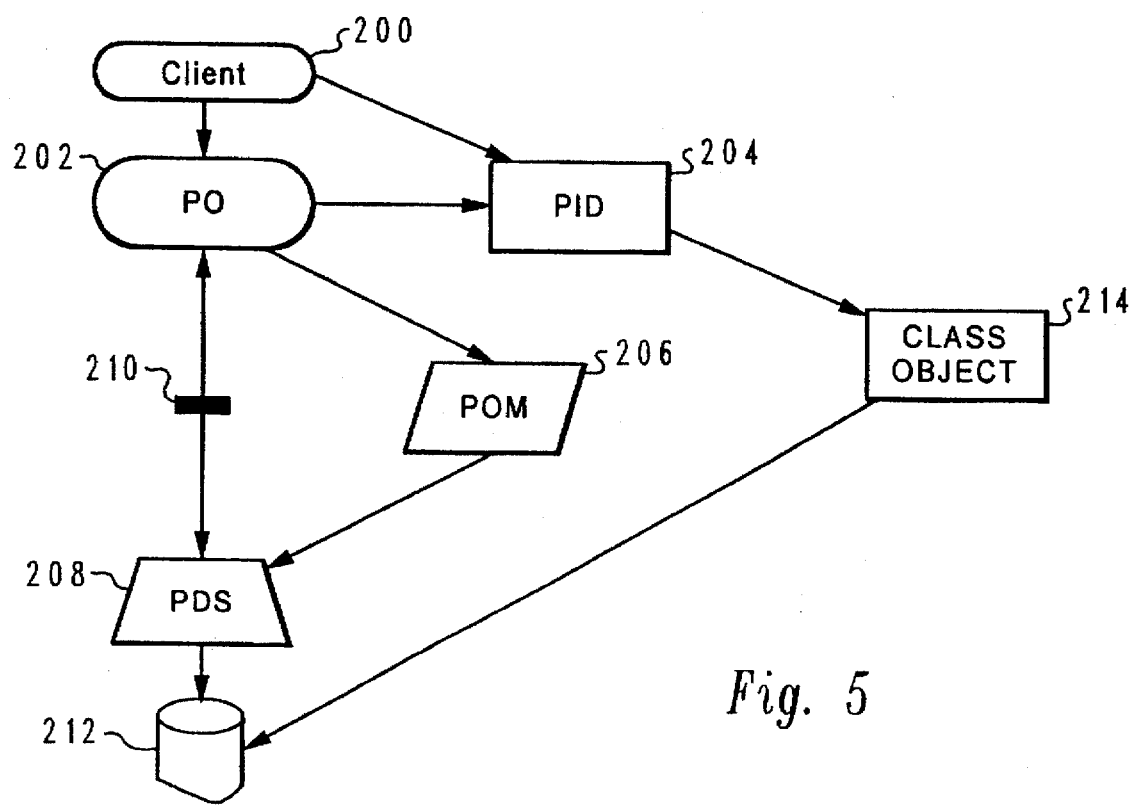
FIG. 5 depicts a diagram of components and their interactions in support object persistence is illustrated in accordance with a preferred embodiment of the present invention.

Referring next to FIG. 5, a diagram of components and their interactions in support object persistence is illustrated in accordance with a preferred embodiment of the present invention. PID 204 is an instance of Class Object 214. According to the present invention, Client 200 sends a request to open Datastore 212 to PID 204, instead of PO 202. PID 204 sends the request to Class Object 214, which includes a method to open Datastore 212. Class Object 214 opens Datastore 212 directly in the depicted embodiment. Datastore 212 also could be opened by Class Object 214 through a request to PDS 208. PID 204 includes open and close operations to open and close Datastore in accordance with a preferred embodiment of the present invention. Since PID 204 accesses Datastore 212 by passing open and close requests from Client 200 to Class Object 214. The opens and closes may be virtual and with the physical opens and closes being handled by Class Object 214. These features are hidden from the perspective of Client 200. "Datastore" is a generic term that refers to a place where data is stored. A Datastore can be, for example, a relational database, an object-oriented database, a record file, or a tape drive.

Figures 6, 7:
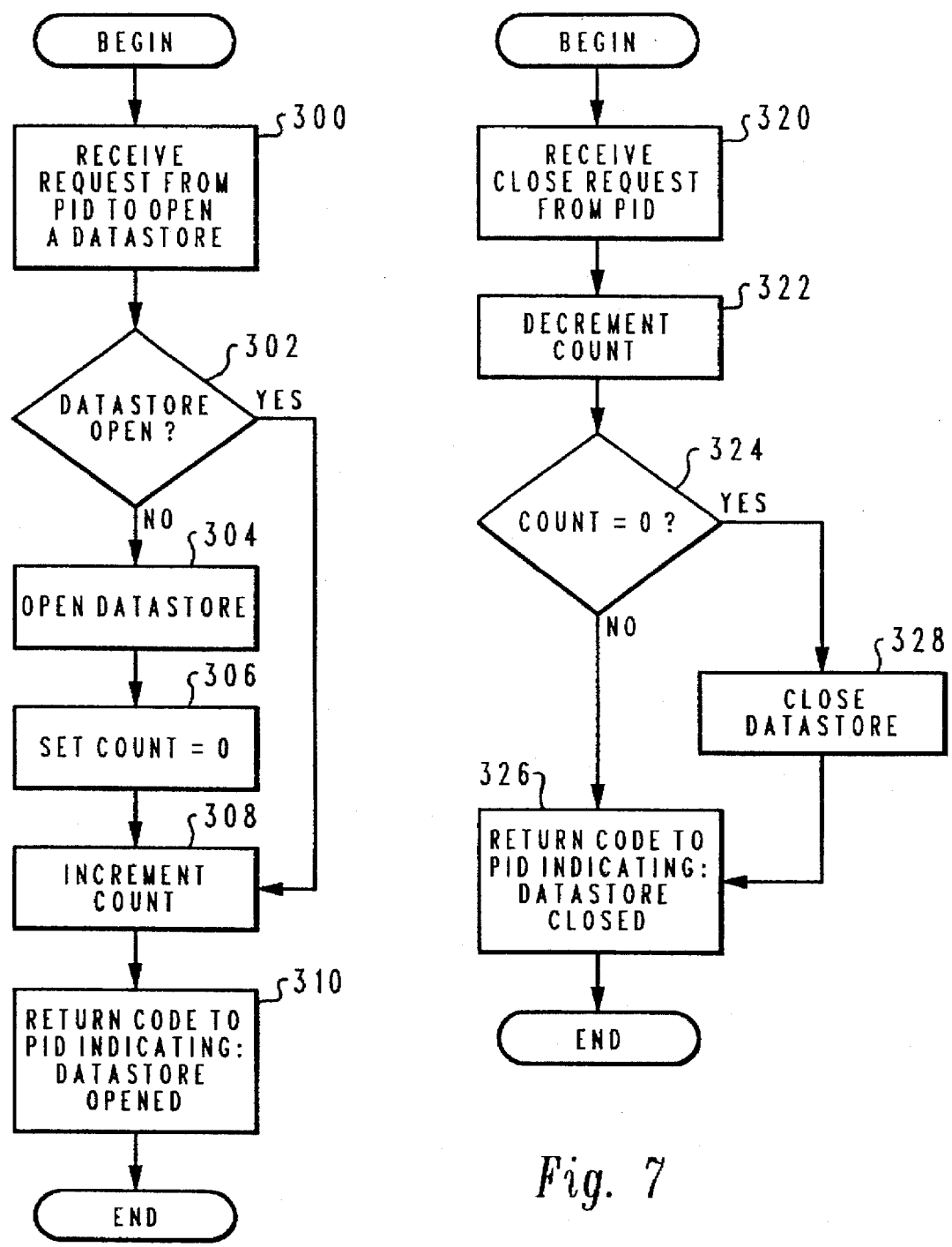
FIG. 6 is a flow chart of a process to open a Datastore using a class object is depicted.
FIG. 7 depicts a flow chart of a process for closing a Datastore is illustrated in accordance with a preferred embodiment of the present invention.

Turning now to FIG. 6, a flow chart of a process to open a Datastore using a class object is depicted. The class object receives a request from a PID to open a Datastore, as depicted in block 300. In response to receiving the request to open a Datastore, a determination is made as to whether the Datastore is open, as illustrated in block 302. If the Datastore is not open, the Datastore is opened, as depicted in block 304. This step represents an actual or physical opening of the Datastore. A variable, COUNT, is set equal to zero, as illustrated in block 306. Then, the COUNT is incremented by one, as depicted in block 308. Thereafter, the class object returns a code to the PID indicating that the Datastore has been opened, as illustrated in block 310. In this case, the Datastore is physically opened.

Referring back to block 302, if the Datastore is already open, the process proceeds directly to block 308 and COUNT is incremented by one, as depicted in block 308. In this case, the process "virtually" opens the Datastore, which is tracked by COUNT. The class object returns a code to the PID indicated that the Datastore has been opened, as illustrated in block 310.

With reference to FIG. 7, a flow chart of a process for closing a Datastore is illustrated in accordance with a preferred embodiment of the present invention. The class object receives a request from a PID to close a Datastore, as depicted in block 320. In response to receiving the request, the class object decrements COUNT by one, as illustrated in block 322. Thereafter, a determination of whether the COUNT is equal to zero is made, as depicted in block 324. If the COUNT is not equal to zero, the class object returns a code to the PID, indicating that the Datastore has been closed. In this case, the Datastore has been virtually closed.

Referring again to block 324 if the COUNT is equal to zero, the class object closes the Datastore, as illustrated in block 328. The Datastore is physically closed. Thereafter, the class object returns a code to the PID, indicating that the Datastore has been closed. The client object is told by the PID that the Datastore in closed even of it is not according to the present invention.

The processes depicted in FIGS. 5–7 may be implemented by those of ordinary skill in the art within the data processing system depicted in FIGS. 1 and 2. The processes of the present invention also may be implemented in a program storage device that is readable by a data processing system, wherein the program storage device encodes data processing system executable instructions coding for the processes of the present invention. The program storage device may take various forms including, for example, but not limited to a hard disk drive, a floppy drive, an optical disk drive, a ROM, and an EPROM, which are known to those skilled in the art. The processes on the program storage device are dormant until activated by using the program storage device with the data processing system. For example, a hard drive containing data processing system executable instructions for the present invention may be connected to a data processing system; a floppy disk containing data processing system executable instructions for the present invention may be inserted into a floppy disk drive in the data processing system; or an ROM containing data processing system executable instruction for the present invention may be connected to the data processing system via a card or adapter connected to an I/O slot.

An advantage of the present invention is that opens and closes by a PID may be virtual with the physical connection to a Datastore being handled by the class object. Thus, performance is increased for client objects. Appendix A illustrates an implementation of a client object using a PID to close and open Datastores of the present invention.

Appendix B depicts the class definition and code for a PID and a PID class object that handles the opening and closing of a Datastore. The class definitions are in CORBA IDL while the implementation of the class definitions are in C. CORBA is a trademark of Object Management Group, Inc. The implementation is for use with IBM System Object Model, which is available from International Business Machines Corporation.

While the invention has been particularly shown and described with reference to a preferred embodiment, it will be understood by those skilled in the art that various changes in form and detail may be made therein without departing from the spirit and scope of the invention.

APPENDIX A

```
main()
{
        PID pid;
        PIDFactory pidfact;
        Account accnt;
        boolean done;
        string accntNo;

pidfact = PIDFactoryNew()
        pid = create_PID_from_key(pidfact, "PID_DB2")
        accnt _ AccountNew();

__set_dbalias(pid, "SAMPLE");
        __set_userid(pid, "Sherlock Holmes")
        __set_password(pid, "Pipe");
        _open_datastore(pid);

done = FALSE;
        while  (!done)  {
                accntNo =readAccntNumber();
                _put_string_item(pid, accntNo);
                _restore(accnt, pid);
                updateAccount(accnt);
                _store(accnt, pid);
        };

/* ... */
        _close_datastore(pid);
}
```

APPENDIX B

```
#ifndef opspid_idl
define opspid_idl include <somobj.idl> interface xxxPID : SOMObject { attribute string datastore_type;

string get_PIDString();

implementation { datastore_type: nodata;
    releaseorder: _get_datastore_type, _set_datastore_type, get_PIDString;
  };
};

#endif /* opspid_idl */
```

..................................................................

```
#ifndef pid_ds_idl
define pid_ds_idl include <opspid.idl>

/*
Forward Declarations.
-------------------- */
interface xxxMemoryStream;

/*
Interface definition.
-------------------- */
interface xxxPID_DS : xxxPID {

/* Constant declarations.
-------------------- */
  const char stringSep = '^';

/* Method declarations.
```

```
                   ------------------ */
   void set_PIDString(in string buffer);

void updatePIDStream();   /* be sure to override */
   void readFromPIDStream(); /* be sure to override */ void open_datastore();        /* client method */
   void close_datastore();       /* client method */
   void *get_datastore_handle(); /* PDS/SM method */ xxxMemoryStream get_stream();

/* Implementation section.
   --------------------- */
   implementation {

/* Data.
   ----- */
      xxxMemoryStream stream;
      string datastore_type;

/* Overrides.
   --------- */
      _get_datastore_type: override;
      _set_datastore_type: override;
      get_PIDString: override;

somInit: override;
      somUninit: override;

/* Administrivia.
   -------------- */
      releaseorder: set_PIDString, updatePIDStream, readFromPIDStream,
               get_stream, open_datastore, close_datastore,
   get_datastore_handle;
      };
   };

#endif /* pid_ds_idl */
```

..........................................................
.

```
#ifndef mpid_ds_idl
define mpid_ds_idl include <somcls.idl>
include <pid_ds.idl> interface xxxM_PID_DS : SOMClass { struct entry {
     void *key;
     long count;
     void *connection_handle;
   };
   const long maxElements = 20;

void open_datastore(in xxxPID_DS pid);
   void close_datastore(in xxxPID_DS pid);
   void *get_datastore_handle(in xxxPID_DS pid);

void *connect_to_ds(in xxxPID_DS pid);              /* to be overriden */
   void disconnect_from_ds(in xxxPID_DS pid);          /* to be overriden */
   void *pid_to_key(in xxxPID_DS pid);                 /* to be overriden */
   boolean compare_key(in void *key1, in void *key2);  /* to be overriden */

/* Private Methods.
   --------------- */
   boolean find_connection(in void *key, out long entry);
   long    add_entry(in void *key, in void *connection_handle);
   void    delete_entry(in void *key);

/* Debugging Methods.
   ------------------ */
   void dump_connectionTable (in void *output);

implementation {

/* Data Members.
   ------------ */
   entry connectionTable[maxElements];
   long nEntries;
   long latch;     /* get type right later */

/* Overrides.
   ---------- */
```

```
    somInit: override;
    somUninit: override;

/* Administrivia.
   -------------- */
    releaseorder: open_datastore, close_datastore, get_datastore_handle,
            connect_to_ds, disconnect_from_ds, pid_to_key, compare_key,
            find_connection, add_entry, delete_entry,
            dump_connectionTable;
  };
};

#endif /* mpid_ds_idl */

................................................................

#define xxxM_PID_DS_Class_Source
define SOMClass_Class_Source include <stdio.h>
include <pid_ds.h>
#include <mpid_ds.ih>

/*
************************************************************************
  Method: open_datastore
  Purpose: implements the connect logic common to all datastore types
Called by: PID_DS
************************************************************************
*/

SOM_Scope void  SOMLINK open_datastore(xxxM_PID_DS somSelf,
                        Environment *ev,
                        xxxPID_DS pid)
{
  void *key;              /* key extracted from the PID */
  long index;             /* connection table index     */
  void *connection_handle;   /* connection handle          */

/* Set up.
   ------- */
  xxxM_PID_DSData *somThis = xxxM_PID_DSGetData(somSelf);
```

```
    xxxM_PID_DSMethodDebug("xxxM_PID_DS","open_datastore");
    printf("mpid_ds::open_datastore\n");

/* Latch connection table.
   --------------------- */

/* Get the datastore key from the PID.
   --------------------------------- */ key = _pid_to_key(somSelf, ev, pid);      /* allocate memory for key */
    printf("----> key = %s\n", (char *) key);

if (_find_connection(somSelf, ev, key, &index)) {

_connectionTable[index].count++;
        printf("----> KEY FOUND\n");

} else { printf("----> KEY NOT FOUND\n");
        connection_handle = _connect_to_ds(somSelf, ev, pid);
        index = add_entry(somSelf, ev, key, connection_handle);
        _connectionTable[index].count++;

} /* endif */

/* Unlatch connection table.
   ------------------------ */

/* Free ressources and return.
   -------------------------- */
    SOMFree(key);
    SOMFree(connection_handle);

_dump_connectionTable(somSelf, ev, stdout);
    return;
}

/*
***********************************************************************
  Method: close_datastore
  Purpose: implements the disconnect logic common to all datastores
 Called by: PID_DS
```

```
**********************************************************************
*/
SOM_Scope void  SOMLINK close_datastore(xxxM_PID_DS somSelf,
                              Environment *ev,
                              xxxPID_DS pid)
{
/* Variable Declarations.
   -------------------- */
   void *key;
   long entry;

/* Set up.
   ------ */
   xxxM_PID_DSData *somThis = xxxM_PID_DSGetData(somSelf);
   xxxM_PID_DSMethodDebug("xxxM_PID_DS","close_datastore");
   printf("mpid_ds::close_datastore\n");

/* Latch connection table
   ---------------------*/

/* Get the datastore key from the PID
   -------------------------------- */ key = _pid_to_key(somSelf, ev, pid);   /* allocate memory for key */ if (_find_connection(somSelf, ev, key, &entry)) {
       _connectionTable[entry].count--;
       if (_connectionTable[entry].count == 0) {
           _disconnect_from_ds(somSelf, ev, pid);
           delete_entry(somSelf, ev, key);
       }
   }

/* Unlatch connection table
   -----------------------*/

/* Free ressources and return.
   -------------------------- */
   SOMFree(key);

_dump_connectionTable(somSelf, ev, stdout);
   return;
}
```

```
/*
*********************************************************************
   Method: get_datastore_handle
   Purpose: returns the datastore connection handle
Called by: PDS
*********************************************************************
*/
SOM_Scope void*  SOMLINK get_datastore_handle(xxxM_PID_DS somSelf,
                                              Environment *ev,
                                              xxxPID_DS pid)
{
/* Variable Declarations.
   ---------------------- */
   void *key;
   long entry;

/* Setup.
   ------ */
   xxxM_PID_DSData *somThis = xxxM_PID_DSGetData(somSelf);
   xxxM_PID_DSMethodDebug("xxxM_PID_DS","get_datastore_handle");
   printf("mpid_ds::get_datastore_handle\n");

/* lookup the connection table.
   --------------------------- */ key = _pid_to_key(somSelf, ev, pid);
   if (!_find_connection(somSelf, ev, key, &entry))
      /* return an exception */

/* Return connection handle.
   ------------------------ */ return(_connectionTable[entry].connection_handle);
}

/*
*********************************************************************
   Method: compare_key
   Purpose: compares 2 connection keys
Called by: open_datastore, close_datastore
Overriden: Yes
*********************************************************************
```

```
*/
SOM_Scope boolean  SOMLINK compare_key(xxxM_PID_DS somSelf,
                         Environment *ev,
                         void* key1,
                         void* key2)
{
/* Set up.
   ------ */
   xxxM_PID_DSData *somThis = xxxM_PID_DSGetData(somSelf);
   xxxM_PID_DSMethodDebug("xxxM_PID_DS","compare_key");
   printf("mpid_ds::compare_key\n");

/* Return statement to be customized: */
   return;
}

/*
 *********************************************************************
   Method: connect_to_ds
   Purpose: datastore specific connection code
 Called by: open_datastore
 Overriden: Yes
 *********************************************************************
*/
SOM_Scope void*  SOMLINK connect_to_ds(xxxM_PID_DS somSelf,
                         Environment *ev,
                         xxxPID_DS pid)
{
/* Set up.
   ------ */
   xxxM_PID_DSData *somThis = xxxM_PID_DSGetData(somSelf);
   xxxM_PID_DSMethodDebug("xxxM_PID_DS","connect_to_ds");
   printf("mpid_ds::connect_to_ds\n");

/* Return statement to be customized: */
   return;
}

/*
 *********************************************************************
   Method: disconnect_from_ds
   Purpose: datastore specific disconnect code
```

```
Called by: close_datastore
Overriden: Yes
***********************************************************************
*/
SOM_Scope void  SOMLINK disconnect_from_ds(xxxM_PID_DS somSelf,
                                Environment *ev,
                                xxxPID_DS pid)
{
   xxxM_PID_DSData *somThis = xxxM_PID_DSGetData(somSelf);
   xxxM_PID_DSMethodDebug("xxxM_PID_DS","disconnect_from_ds");
   printf("mpid::disconnect_from_ds\n");
}

/*
***********************************************************************
  Method: pid_to_key
  Purpose: Extracts the datastore key from the PID
 Called by:
 Overriden: Yes
***********************************************************************
*/
SOM_Scope void*  SOMLINK pid_to_key(xxxM_PID_DS somSelf,
                                Environment *ev,
                                xxxPID_DS pid)
{
   xxxM_PID_DSData *somThis = xxxM_PID_DSGetData(somSelf);
   xxxM_PID_DSMethodDebug("xxxM_PID_DS","pid_to_key");
   printf("mpid::pid_to_key\n");

/* Return statement to be customized: */
   return;
}

/*
***********************************************************************
  Method: find_connection
  Purpose: Search a key in the connectionTable.
  Output: Returns success (1) or failure (0). If successful, initializes
          entry with the connectionTable index where key was found.
 Called by: open_datastore, close_datastore
 Overriden: No
***********************************************************************
*/
```

```c
SOM_Scope boolean  SOMLINK find_connection(xxxM_PID_DS somSelf,
                                           Environment *ev,
                                           void* key,
                                           long* index)
{
/* Variable Declarations.
   -------------------- */
    boolean match;
    long n;

/* Setup.
   ----- */
    xxxM_PID_DSData *somThis = xxxM_PID_DSGetData(somSelf);
    xxxM_PID_DSMethodDebug("xxxM_PID_DS","find_connection");
    printf("mpid_ds::find_connection\n");
    printf("----> input key = %s\n", (char *) key);

/* Find key.
   -------- */ match = FALSE;
    for (n=0; n < maxElements; n++) { if (_compare_key(somSelf, ev, key, _connectionTable[n].key)) {
            match = TRUE;
            *index = n;
            printf("----> returned index = %ld\n", *index);
            break;
        } /* endif */

} /* end for */

/* Done.
   ---- */
    printf("----> match = %ld\n", match);
    return(match);
}

/*
*************************************************************************
  Method: add_entry
  Purpose: Add an entry in the first available slot in connectionTable.
  Output: Returns index into connectionTable where key was added.
  Called by: open_datastore
```

Overriden: No
`*********************************************************************`
*/
```
SOM_Scope long  SOMLINK add_entry(xxxM_PID_DS somSelf,
                                  Environment *ev,
                                  void* key,
                                  void* connection_handle)
{
/* Variable Declarations.
   -------------------- */
    long  index;
    entry *cte;

/* Setup.
   ------ */
    xxxM_PID_DSData *somThis = xxxM_PID_DSGetData(somSelf);
    xxxM_PID_DSMethodDebug("xxxM_PID_DS","add_entry");
    printf("mpid_ds::add_entry\n");

/* Find first available entry in the connection Table.
   ------------------------------------------------- */
    if (_nEntries < maxElements) { for (index = 0; index < maxElements; index++) { if (_connectionTable[index].key == NULL) {

_connectionTable[index].key = SOMMalloc(strlen(key) + 1);
                strcpy(_connectionTable[index].key, key);
                printf("----> key = %s\n", _connectionTable[index].key);

_connectionTable[index].count = 0;
                printf("----> count = %s\n", _connectionTable[index].count);

_connectionTable[index].connection_handle =
SOMMalloc(strlen(connection_handle) + 1);
                strcpy(_connectionTable[index].connection_handle,
connection_handle);
                printf("----> handle = %s\n",
_connectionTable[index].connection_handle);

_nEntries++;
                break;
            }
```

```
        } /* end for */

} else {

/* return an exception: connection table is full */
        printf("----> CONNECTION TABLE FULL\n");

} /* endif */

/* Done.
   ---- */
    printf("---->  returned index = %d\n", index);
    return(index);
}

/*
***********************************************************************
  Method: delete_entry
  Purpose: Removes an entry from the connectionTable.
  Output: None
Called by: close_datastore
Overriden: No
***********************************************************************
*/
SOM_Scope void SOMLINK delete_entry(xxxM_PID_DS somSelf,
                                    Environment *ev,
                                    void* key)
{
/* Variable Declarations.
   -------------------- */
    long  index;        /* index into the connection table   */
    entry *cte;         /* pointer to a connection table entry */

/* Setup.
   ----- */
    xxxM_PID_DSData *somThis = xxxM_PID_DSGetData(somSelf);
    xxxM_PID_DSMethodDebug("xxxM_PID_DS","delete_entry");
    printf("mpid_ds::delete_entry\n");

/* Delete entry from the connection table.
   -------------------------------------- */ for (index = 0; index < maxElements; index++) {
```

```
         if (_compare_key(somSelf, ev, _connectionTable[index].key,key)) { cte = &_connectionTable[index];
            cte->key = NULL;
            cte->count = 0;
            cte->connection_handle = NULL;

SOMFree(cte->key);
            SOMFree(cte->connection_handle);

_nEntries--;
            break;

} /* endif */
      } /* end for */ printf("----> deleted index = %d\n", index);
}

/*
*********************************************************************
  Method: dump_connectionTable
  Purpose: Dump the connection table in the output file for
           debugging purpose.
*********************************************************************
*/
SOM_Scope void  SOMLINK dump_connectionTable(xxxM_PID_DS somSelf,
                                Environment *ev,
                                void* output)
{
   long  n;
   FILE  *outfile;
   entry *cte;

xxxM_PID_DSData *somThis = xxxM_PID_DSGetData(somSelf);
   xxxM_PID_DSMethodDebug("xxxM_PID_DS","dump_connectionTable");

outfile = (FILE *) output;

fprintf(outfile, "\n");
   fprintf(outfile, "CONNECTION TABLE CONTENT:\n");
   fprintf(outfile, "-----------------------------------\n");
```

```
    for (n = 0; n < maxElements; n++) {
        cte = &_connectionTable[n];
        if (cte->key != NULL) {
            fprintf(outfile, "%1d %20s %1d %10s\n", n,
                    cte->key, cte->count, cte->connection_handle);
        } /* endif */
    } /* endfor */ fprintf(outfile, "Number of Table entries: %d\n", _nEntries);
    fprintf(outfile, "\n");
}

/*
*************************************************************************
  Method: somInit
  Purpose: Initializes the connectionTable.
*************************************************************************
*/
SOM_Scope void  SOMLINK somInit(xxxM_PID_DS somSelf)
{
/* Variable Declarations.
   ---------------------- */
    long n;
    entry cte;              /* connection table entry */

/* Set up.
   ------ */
    xxxM_PID_DSData *somThis = xxxM_PID_DSGetData(somSelf);
    xxxM_PID_DSMethodDebug("xxxM_PID_DS","somInit");
    printf("mpid_ds::somInit\n");

xxxM_PID_DS_parent_SOMClass_somInit(somSelf);

/* Initializes connection table.
   ----------------------------- */

_nEntries = 0;
    for (n=0; n < maxElements; n++) {
        _connectionTable[n].key = NULL;
        _connectionTable[n].count = 0;
        _connectionTable[n].connection_handle = NULL;
    }
}
```

```
/*
************************************************************************
   Method: somUninit
   Purpose: Frees up ressources
************************************************************************
*/
SOM_Scope void  SOMLINK somUninit(xxxM_PID_DS somSelf)
{

/* Variable Declarations.
   ---------------------- */
   long n;
   entry *cte;     /* pointer to a connection table entry */

/* Set up.
   ------- */
   xxxM_PID_DSData *somThis = xxxM_PID_DSGetData(somSelf);
   xxxM_PID_DSMethodDebug("xxxM_PID_DS","somUninit");
   printf("mpid_ds::somUninit\n");

/* Free connection table.
   ---------------------- */ for (n=0; n < maxElements; n++) {
      cte = &_connectionTable[n];
      if (cte->key != NULL) {
         SOMFree(cte->key);
         SOMFree(cte->connection_handle);
      } /* endif */
   } xxxM_PID_DS_parent_SOMClass_somUninit(somSelf);
}
```

........................................................................
.

```
#define xxxPID_Class_Source
#include <opspid.ih>
```

```
/*
*********************************************************************
   Method: _get_datastore_type
   Purpose: gets the datastore type for this PID
 Overriden: YES - this is overriden by the PID_DS
*********************************************************************
*/
SOM_Scope string  SOMLINK _get_datastore_type(xxxPID somSelf,
                                      Environment *ev)
{
/* xxxPIDData *somThis = xxxPIDGetData(somSelf); */
   xxxPIDMethodDebug("xxxPID","_get_datastore_type");

/* Return statement to be customized: */
   return;
}

/*
*********************************************************************
   Method: _set_datastore_type
   Purpose: sets the datastore type for this PID
 Overriden: YES - this is overriden by the PID_DS
*********************************************************************
*/
SOM_Scope void  SOMLINK _set_datastore_type(xxxPID somSelf, Environment *ev,
                                   string datastore_type)
{
/* xxxPIDData *somThis = xxxPIDGetData(somSelf); */
   xxxPIDMethodDebug("xxxPID","_set_datastore_type");

}

/*
*********************************************************************
   Method: get_PIDString
   Purpose: gets the PID in a string format
 Overriden: YES - this is overriden by the PID_DS
*********************************************************************
*/
SOM_Scope string  SOMLINK get_PIDString(xxxPID somSelf, Environment *ev)
{
/* xxxPIDData *somThis = xxxPIDGetData(somSelf); */
   xxxPIDMethodDebug("xxxPID","get_PIDString");
```

```
/* Return statement to be customized: */
  return;
}

..................................................................
.

#define xxxPID_DS_Class_Source
#include <stdio.h>
#include <pid_ds.ih>
#include <mpid_ds.h>
#include <stream.h>
#include <memstrm.h>

/*
*********************************************************************
  Method: set_PIDString
  Purpose: Take a string and reset the PID
  Called by: PID Factory
*********************************************************************
*/
SOM_Scope void  SOMLINK set_PIDString(xxxPID_DS somSelf, Environment *ev,
                 string buffer)
{
/* Set up.
   ------ */
  xxxPID_DSData *somThis = xxxPID_DSGetData(somSelf);
  long length;
  long n;
  xxxPID_DSMethodDebug("xxxPID_DS","set_PIDString");

/* Replace string seperator charactor by NULLS.
   ------------------------------------------ */
  printf("pid_ds::set_PIDString:Replace separator by NULL\n");
  length = strlen(buffer) + 1;
  for (n=0; n<=length; n++) {
     if (*(buffer+n) == xxxPID_DS_stringSep) *(buffer+n) = '\0';
  }
/* Set stream.
   ---------- */
  printf("pid_ds::set_PIDString: call _set_buffer\n");
  _set_buffer(_stream, ev, buffer, length);
  printf("pid_ds::set_PIDString: call _readFromPIDStream\n");
```

Appendix B page 17

```
    _readFromPIDStream(somSelf, ev);
}

/*
*********************************************************************
  Method: updatePIDStream
  Purpose: Add this level's data to the PID stream
          Should be overriden by derived classes
Called by: get_PIDString
*********************************************************************
*/
SOM_Scope void  SOMLINK updatePIDStream(xxxPID_DS somSelf, Environment *ev)
{
/* Set up.
   ------ */
    xxxPID_DSData *somThis = xxxPID_DSGetData(somSelf);
    string className;
    xxxPID_DSMethodDebug("xxxPID_DS","updatePIDStream");

/* Add class of PID.
   ---------------- */
    className = _somGetClassName(somSelf);
    _put_string_item(_stream, ev, className);
    SOMFree(className);

/* Add datastore_type of PID.
   ------------------------- */
    _put_string_item(_stream, ev, _datastore_type);
}

/*
*********************************************************************
  Method: readFromPIDStream
  Purpose: Read this level's data from the PID stream
          Should be overriden by derived classes
Called by: get_PIDString
*********************************************************************
*/
SOM_Scope void  SOMLINK readFromPIDStream(xxxPID_DS somSelf,
                                   Environment *ev)
{
/* Set up.
   ------ */
```

```
    xxxPID_DSData *somThis = xxxPID_DSGetData(somSelf);
    string className;
    string dsType;
    xxxPID_DSMethodDebug("xxxPID_DS","readFromPIDStream");

/* Get class of PID.
   ----------------- */
    className = _get_string_item(_stream, ev);
    SOMFree(className);

/* Get datastore_type of PID.
   ------------------------- */
    dsType = _get_string_item(_stream, ev);
    _set_datastore_type(somSelf, ev, dsType);
    SOMFree(dsType);
}

/*
*********************************************************************
   Method: open_datastore
   Purpose: Do a logical open on the PID
  Called by: client
*********************************************************************
*/
SOM_Scope void  SOMLINK open_datastore(xxxPID_DS somSelf,  Environment *ev)
{
/* Set up.
   ------ */
    xxxPID_DSData *somThis = xxxPID_DSGetData(somSelf);
    xxxM_PID_DS classObj;
    xxxPID_DSMethodDebug("xxxPID_DS","open_datastore");

/* Passthru.
   -------- */
    printf("pid_ds::open_datastore\n");
    classObj = _somGetClass(somSelf);
    xxxM_PID_DS_open_datastore(classObj, ev, somSelf);

}

/*
*********************************************************************
   Method: close_datastore
```

```
  Purpose: Do a logical close on the PID
  Called by: Client
 ********************************************************************
 */
 SOM_Scope void  SOMLINK close_datastore(xxxPID_DS somSelf, Environment *ev)
 {
 /* Set up.
    ------- */
    xxxPID_DSData *somThis = xxxPID_DSGetData(somSelf);
    xxxM_PID_DS classObj;
    xxxPID_DSMethodDebug("xxxPID_DS","close_datastore");

/* Passthru.
    --------- */
    printf("pid_ds::close_datastore\n");
    classObj = _somGetClass(somSelf);
    xxxM_PID_DS_close_datastore(classObj, ev, somSelf);

}

/*
 ********************************************************************
   Method: get_datastore_handle
   Purpose: Get the datastore handle from the meta class
  Called by: PDS
 ********************************************************************
 */
 SOM_Scope void*  SOMLINK get_datastore_handle(xxxPID_DS somSelf,
                                   Environment *ev)
 {
 /* Set up.
    ------- */
   xxxPID_DSData *somThis = xxxPID_DSGetData(somSelf);
   void *handle;
   xxxM_PID_DS classObj;
   xxxPID_DSMethodDebug("xxxPID_DS","get_datastore_handle");

/* Passthru.
    --------- */
   classObj = _somGetClass(somSelf);
   handle = xxxM_PID_DS_get_datastore_handle(classObj, ev, somSelf);
   return handle;
 }
```

```
/*
**********************************************************************
   Method: get_stream
   Purpose: Get the stream used for reading and writing to.
   Called by: Overriden versions of updatePIDStream
**********************************************************************
*/
SOM_Scope xxxMemoryStream  SOMLINK get_stream(xxxPID_DS somSelf,
                                    Environment *ev)
{
  xxxPID_DSData *somThis = xxxPID_DSGetData(somSelf);
  xxxPID_DSMethodDebug("xxxPID_DS","get_stream");

return _stream;
}

/*
**********************************************************************
   Method: _get_datastore_type
   Purpose: gets the data store for this PID
   Called by: POM
**********************************************************************
*/
SOM_Scope string  SOMLINK _get_datastore_type(xxxPID_DS somSelf,
                                    Environment *ev)
{
  xxxPID_DSData *somThis = xxxPID_DSGetData(somSelf);
  xxxPID_DSMethodDebug("xxxPID_DS","_get_datastore_type");
  return _datastore_type;
}

/*
**********************************************************************
   Method: _set_datastore_type
   Purpose: sets the data store for this PID
   Called by: client or factory
**********************************************************************
*/
SOM_Scope void  SOMLINK _set_datastore_type(xxxPID_DS somSelf,
                                    Environment *ev,
                                    string datastore_type)
{
/* Set up.
   ------ */
```

```
    xxxPID_DSData *somThis = xxxPID_DSGetData(somSelf);
    long length;
    xxxPID_DSMethodDebug("xxxPID_DS","_set_datastore_type");

/* Allocate and return.
   -------------------- */
    if (_datastore_type) SOMFree(_datastore_type);

length = strlen(datastore_type) + 1;
    _datastore_type = SOMMalloc(length);
    strcpy(_datastore_type, datastore_type);
}

/*
*********************************************************************
  Method: get_PIDString
  Purpose: get the PID in a string format
  Called by: client
*********************************************************************
*/
SOM_Scope string SOMLINK get_PIDString(xxxPID_DS somSelf, Environment *ev)
{
/* Set up.
   ------ */
    xxxPID_DSData *somThis = xxxPID_DSGetData(somSelf);
    string result;
    long length;
    long n;
    xxxPID_DSMethodDebug("xxxPID_DS","get_PIDString");

/* Get stream.
   ---------- */
    _reset(_stream, ev);
    _updatePIDStream(somSelf, ev);
    result = _get_buffer(_stream, ev);

/* Replace string nulls by string seperator.
   ---------------------------------------- */
    length = _get_length(_stream, ev);
    for (n=0; n<=length; n++) {
        if (*(result+n) == '\0') *(result+n) = xxxPID_DS_stringSep;
    }
/* Replace trailing string seperators by nulls.
   ------------------------------------------- */
```

Appendix B page 22

```
    n = length;
    for (;;) {
      if (*(result+n) != xxxPID_DS_stringSep) {
          break;
      }
      *(result+n) = '\0';
      n--;
    }
    return result;
}

/*
***********************************************************************
  Method: somInit
  Purpose: Initialize object
 Called by: som run time
***********************************************************************
*/
SOM_Scope void  SOMLINK somInit(xxxPID_DS somSelf)
{
/* Set up.
   ------- */
  xxxPID_DSData *somThis = xxxPID_DSGetData(somSelf);
  Environment *ev;
  xxxPID_DSMethodDebug("xxxPID_DS","somInit");
  xxxPID_DS_parent_xxxPID_somInit(somSelf);
  ev = SOM_CreateLocalEnvironment();

/* initialize our data.
   -------------------- */
  _datastore_type = 0;
  _set_datastore_type(somSelf, ev, "Unknown");
  _stream = xxxMemoryStreamNew();

/* Finished.
   --------- */
  SOM_DestroyLocalEnvironment(ev);

}

/*
***********************************************************************
  Method: somUninit
  Purpose: Free object resources
```

```
Called by: som Run Time
***********************************************************************
*/
SOM_Scope void SOMLINK somUninit(xxxPID_DS somSelf)
{
/* Set up.
   ------ */
  xxxPID_DSData *somThis = xxxPID_DSGetData(somSelf);
  xxxPID_DSMethodDebug("xxxPID_DS","somUninit");

/* Free object resources.
   -------------------- */
  SOMFree(_datastore_type);
  _somFree(_stream);
  xxxPID_DS_parent_xxxPID_somUninit(somSelf);
}
```

What is claimed is:

1. A method in a data processing system for optimizing access to a Datastore in an object oriented environment, wherein said data processing system includes an object and an identification object, wherein said identification object is within a class object, said method comprising the data processing system implemented steps of:

receiving a request to open said Datastores at said identification object;

sending said request from said identification object to said class object in response to receiving said request;

determining whether said Datastores is open in response to receiving said request at said class object;

opening said Datastore in response to a determination that said Datastore is closed and sending a message to said identification object indicating that said Datastore has been opened;

sending a message to said identification object indicating that said Datastores has been opened in response to a determination that said Datastores is open;

receiving a request to close said Datastores at said identification object;

sending said request from said identification object to said class object in response to receiving said request at said identification object;

determining whether other objects require said Datastore to remain open;

closing said Datastore is response to a determination that a requirement that said Datastore remain open is absent; and sending a message to said identification object indicating that said Datastore has been closed, wherein access to said Datastores is optimized.

2. A data processing system for optimizing access to a Datastore in an object-oriented environment, wherein said data processing system includes an object and an identification object, wherein said identification object is within a class object, said data processing system comprising:

reception means for receiving a request to open said Datastore at said identification object;

first sending means for sending said request from said identification object to said class object in response to receiving said request;

determination means for determining whether said Datastore is open in response to receiving said request at said class object;

opening means for opening said Datastore in response a determination that said Datastore is closed and sending a message to said identification object indicting that said Datastore has been opened;

second sending means for sending a message to said identification object indicating than said Datastore has been opened in response to a determination that said Datastore is open;

second receiving means for receiving a request to close said Datastore at said identification object;

third sending means for sending said request from said identification object to said class object in response to receiving said request at said identification object;

second determination means for determining whether other objects require said Datastore to remain open;

closing means for closing said Datastore in response to a determination that a requirement that said Datastore remain open is absent; and fourth sending means for sending a message to said identification object indicating that said Datastore has been closed, wherein access to said Datastore is optimized.

3. The data processing system of claim 2, wherein said Datastore is a relational database.

4. The data processing system of claim 3, wherein the reception means receives a request from a client object.

5. A system for optimizing and closing of a Datastore comprising:

a reception means for receiving a request from a requesting object to access a Datastore;

access means for accessing said Datastore in response to receiving said request, said access means including:

first determination means, responsive to receiving a request to open said Datastore at said reception means, for determining whether said Datastore is open;

first opening means for opening said Datastore, responsive to a determination that said Datastore is closed;

second opening means for virtually opening said Datastore, responsive to a determination that said Datastore is already opened;

second determination means, responsive receiving a request to close said Datastore at said reception means, for determining whether a requirement exists for said Datastore to remain open;

first closing means for closing said Datastore responsive to a determination that a requirement that said Datastore remain open is absent; and second closing means for virtually closing said Datastore, responsive to a determination that a requirement exists for said Datastore to remain open.

6. A method in a data processing system for optimizing access to a datastore in an object-oriented environment, wherein the data processing system includes a class object and a persistent identifier, the method comprising the data processing system implemented steps of:

receiving a request from the persistent identifier to open the datastore at the class object;

determining whether the datastore is open in response to receiving the request from the persistent identifier at the class object;

opening the datastore in response to a determination that the datastore is closed and sending a message to the persistent identifier that the datastore has been opened;

sending a message to the persistent identifier indicating that the datastore has been opened in response to a determination that the datastore is already opened;

receiving a request from the persistent identifier to close the datastore;

determining whether other objects require the datastore to remain open in response to receiving the request from the persistent identifier to close the datastore;

closing the datastore and sending a message to the persistent identifier indicating that the datastore has been closed in response to a determination that a requirement that the datastore remain open is absent; and leaving the datastore open and sending a message to the persistent identifier indicating that the datastore has been closed in response to a determination that a requirement that the datastore remain open is present, wherein the datastore is virtually opened and closed by the persistent identifier and the class object provides a physical connection to the datastore wherein opening and closing of the datastore is optimized.

* * * * *

UNITED STATES PATENT AND TRADEMARK OFFICE
CERTIFICATE OF CORRECTION

PATENT NO. : 5,694,597
DATED : December 2, 1997
INVENTOR(S) : Cantin et al.

It is certified that error appears in the above-indentified patent and that said Letters Patent is hereby corrected as shown below:

On the title page,
Under Attorney, Agent or Firm: change "Lee" to --Yee--

Signed and Sealed this

Thirty-first Day of March, 1998

Attest:

BRUCE LEHMAN

Attesting Officer

Commissioner of Patents and Trademarks